Patented May 4, 1943

2,318,126

UNITED STATES PATENT OFFICE 2,318,126

LATEX ADHESIVE

Louis Spraragen, Bridgeport, Conn., assignor to Angier Products, Inc., Cambridge, Mass., a corporation of Massachusetts No Drawing. Application August 13, 1940, Serial No. 352,467

9 Claims. (Cl. 260—739)

This invention relates to an improved latex adhesive which is relatively stable and at the same time has strong bonding properties with high initial strength.

Aqueous rubber dispersions either as natural or artificial latices have been combined with various reagents for use as adhesives but such materials have been unsatisfactory in one or more respects such as instability during storage, low initial bonding strength and the like. To obviate these and other limitations of the latex adhesives heretofore known, rubber together with modifying ingredients including fillers, softeners, etc. has been dissolved in rubber solvents. The volatility and inflammability of such solvents produced dangerous fire hazards and it was necessary to permit films of these cements to dry before a bond could be secured.

The present invention seeks to provide a latex adhesive with a stability comparable to that of the latex itself.

Another object of the invention is to provide a latex adhesive that forms a bond between two surfaces promptly after application, which bond will have high initial strength.

It is also an object of the invention to provide a latex adhesive comprising an aqueous dispersion of rubber containing a lower alkyl ester of crotonic acid.

A further object resides in providing the method for preparing a latex adhesive which comprises gradually mixing a lower alkyl ester of crotonic acid into an aqueous dispersion of rubber.

It has been found that a latex adhesive may be prepared from the available latices either natural or artificial. Such latices are usually stabilized by the addition of ammonia to prevent premature coagulation during storage or transit. In the practice of this invention, natural stabilized latex which has been concentrated by centrifuging to what is commercially known as 60% centrifuged latex has been successfully employed and when treated as hereinafter described, the adhesive may have a stability generally comparable to that of the latex for purposes of storage, transit or use, yet quickly produces an adhesive film when applied to surfaces which are to be joined.

To prepare the adhesive, from 2 to 25% of a lower alkyl ester of crotonic acid (such as methyl, ethyl, or butyl), preferably ethyl crotonate, is carefully and slowly mixed into the latex. Crotonic acid or its derivatives, other than the esters, cannot be used. The acid and the aldehyde cause immediate coagulation. Alkyl esters become less effective as the number of carbon atoms are increased. If the ester is stirred in slowly, no local coagulation will occur. More rapid mixing is permissible if 2% of ammonia is added to the ethyl crotonate before it is mixed into the latex but this does not have any appreciable effect on the stability of the adhesive.

For most purposes, the addition of from 5–10% of ethyl crotonate is sufficient and the product is stable for as long as sixty days when stored in clear glass bottles out of direct sunlight. Excessive agitation will cause more rapid creaming or coagulation. When the amount of ethyl crotonate is increased above 10% (based on the volume of the latex), creaming or coagulation occurs sooner until at about 25% it takes place in from four to twelve hours. Products with these characteristics have but limited utility and it is therefore preferred to use from about 5 to 15% of ethyl crotonate with a 60% latex which for special uses may be compounded with various colloids.

The adhesive prepared as described may be used to join surfaces of various types and materials as, for example, sponge rubber. It may be applied with a brush or by dipping into a bath, care being taken to avoid local coagulation. The coated surfaces can be joined while wet; they may be allowed to dry and then combined, or they may be subjected to moderate heat as by a blast of heated air and then united. A bond of high initial strength is readily obtained with this adhesive.

While the invention has been described with reference to certain preferred embodiments of the invention, these are to be considered as illustrative and not in limitation of the invention.

I claim:

1. A latex adhesive comprising an aqueous dispersion of rubber containing up to about 25% of a lower alkyl ester of crotonic acid in which the alkyl radical contains no more than four carbon atoms.

2. A latex adhesive comprising a 60% latex and from 2 to 25% of ethyl crotonate.

3. A latex adhesive comprising an aqueous dispersion of rubber containing from 2 to 25% of ethyl crotonate.

4. A latex adhesive comprising centrifuged latex and from 2 to 25% of ethyl crotonate.

5. The method for preparing a latex adhesive which comprises gradually mixing up to about 25% of a lower alkyl ester of crotonic acid in which the alkyl radical contains no more than four carbon atoms into an aqueous dispersion of rubber.

6. The method for preparing a latex adhesive which comprises gradually mixing up to about 25% of ethyl crotonate into an aqueous dispersion of rubber.

7. The method for preparing a latex adhesive which comprises gradually mixing from 2 to 25% of ethyl crotonate into an aqueous dispersion of rubber.

8. The method for preparing a latex adhesive which comprises gradually adding a mixture of approximately 2% of ammonia and from 2 to 25% of ethyl crotonate to an aqueous dispersion of rubber.

9. A latex adhesive comprising a centrifuged approximately 60% natural latex and from 5 to 15% of ethyl crotonate.

LOUIS SPRARAGEN.